United States Patent [19]
Dorsey

[11] Patent Number: 5,161,324
[45] Date of Patent: Nov. 10, 1992

[54] OBJECT SUPPORTING APPARATUS

[76] Inventor: Harris J. Dorsey, 1917 Stella Cir., Port Neches, Tex. 77651

[21] Appl. No.: 804,108

[22] Filed: Dec. 6, 1991

[51] Int. Cl.⁵ .............................................. A01K 91/00
[52] U.S. Cl. .................... 43/44.9; 43/44.87; 43/43.1; 43/44.91
[58] Field of Search ............... 43/44.9, 44.91, 43.1, 43/44.87

[56] References Cited

U.S. PATENT DOCUMENTS

| | | | |
|---|---|---|---|
| 3,124,892 | 3/1964 | O'Brien | 43/43.1 |
| 3,589,052 | 6/1971 | King | 43/44.91 |
| 4,235,037 | 11/1980 | Sivertsen | 43/44.91 |
| 4,359,836 | 11/1982 | Yuji | 43/44.87 |
| 4,696,125 | 9/1987 | Rayburn | 43/44.9 |
| 4,829,705 | 5/1989 | Dorsey | 43/44.99 |

FOREIGN PATENT DOCUMENTS 899860  9/1944  France ........................... 43/44.91

Primary Examiner—Kurt G. Rowan
Attorney, Agent, or Firm—Vaden, Eickenroht, Thompson, Boulware & Feather

[57] ABSTRACT

There is disclosed a body of bouyant material adapted to float on the water surface and a flexible line from which a chum basket may be suspended and adapted to be adjustably supported from the body.

7 Claims, 1 Drawing Sheet

OBJECT SUPPORTING APPARATUS

This invention relates to improved apparatus for suspending an object, such as a chum basket, at a desired level beneath the water surface.

As shown and described, for example, in my U.S. Pat. No. 4,829,705, a chum basket comprises a container for fish food of such construction as to automatically dispense the food therefrom in response to movement of the container in the water. This movement may result from one or more of contact by the fish, water currents, or deliberate inducement by the fisherman.

In any case, it is necessary to suspend the chum basket beneath the water surface in such a manner that it is free to move in this manner. The level at which the container is to be suspended beneath the water surface depends, of course, on the depth of the water as well as that deemed best by the fisherman. Obviously, much time and effort would be involved in providing a flexible line of the desired length for each particular situation encountered by the fisherman. Thus, there is a need for and the object of this invention to provide simple and inexpensive apparatus which enables an object, such as a chum basket, to be easily and quickly suspended from such a line at different depths beneath the water surface.

This and other objects are accomplished, in accordance with the illustrated embodiments of the invention, by apparatus which includes a body of buoyant material having a central cavity and adapted to float on the water surface with its cavity uppermost, a flexible line having one end from which the object may be suspended and beads at spaced locations (perhaps every 12") along its length, and means on the body forming a small hole connecting the cavity with its lower side through which the line but not the beads may extend, whereby each bead may be lowered onto a seat about the upper end of the hole, and a slot extending laterally from the hole and through which the line may be moved into a relieved area within the cavity through which the beads may pass into and out of the cavity and then back into the hole to permit a selected bead to be supported on the seat Preferably, a means is provided in the cavity about which the free end of the line may be wound for storage purposes. Thus, when the supported object is a chum basket, for example, the free end of the line is concealed from view by the fish as well as being conveniently located in the event the user wishes to adjust the depth of the object. As illustrated, this means for storing the free end of the line may comprise a plurality of hooks spaced about the periphery of the cavity, or, alternatively the outer surface of an upstanding boss through which the hole and slot extend.

In one embodiment, the body includes a lower wall beneath the cavity and through which a passage is formed, and the hole and slot are formed in a hollow tube removably supported within the passage to connect the slot with an enlarged area within the cavity. In another embodiment, the opening and slot are formed in a lower wall supported from the body beneath the cavity, and the enlarged area comprises a large hole in the lower wall at the end of the slot away form the small hole.

In the drawings, wherein like reference characters are used throughout to designate like parts:

Figure 1:
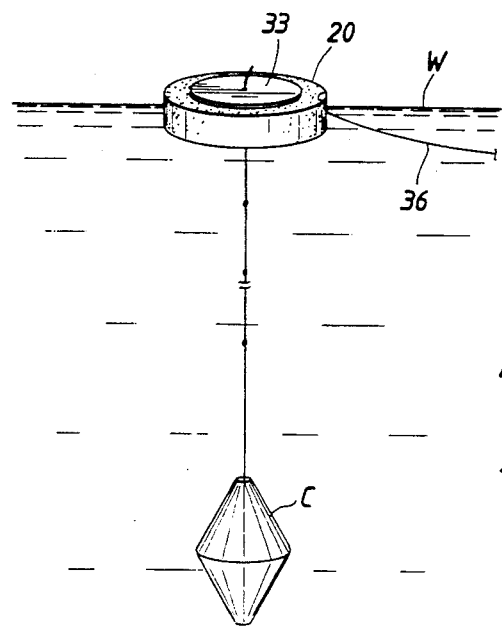
FIG. 1 is a side view of a chum basket supported beneath the water surface by means of apparatus constructed in accordance with one embodiment of the present invention.

With reference to the details of the above described drawings, the apparatus shown in FIG. 1 for suspending a chum basket C at a desired level of the water surface W comprises a body 20 of bouyant material, such as Styrofoam, which is adapted to float on the water surface with a cavity 21 therein opening to its upper side when the body is positioned to support the chum basket. As shown, the body is of generally disc shape with a lower wall 22 beneath the cavity 21, and the cavity is of cylindrical shape arranged concentrically of the outer wall of the body 20.

A flexible line 24, which may be string, extends downwardly through the lower wall for attachment in any suitable manner to the upper end of the chum basket C. More particularly, the string is adjustably supported from the lower wall for suspending the chum basket at a desired level beneath the water surface. The weight of the chum basket of course adds stability to maintain the body 20 in a generally level position on the water surface.

As shown, an upstanding boss 25 is formed on the upper side of the wall 22 within the cavity 21 in surrounding relation to the upper end of a passage 23 through the wall. More particularly, the inner diameter of the boss 25 somewhat larger than the passage 23 to provide a seat 26 on the upper side of the wall 22. The flanged upper end 27 of a hollow tube 28 engages the seat 26 to support the lower end of the tube with a relatively close fit within the passages 23, and the line 24 extends through a hole 32 in the tube. Slots 29 are formed in the opposite sides of the boss 25 and a slot 30 is formed in one side of the tube 28.

Figure 2:
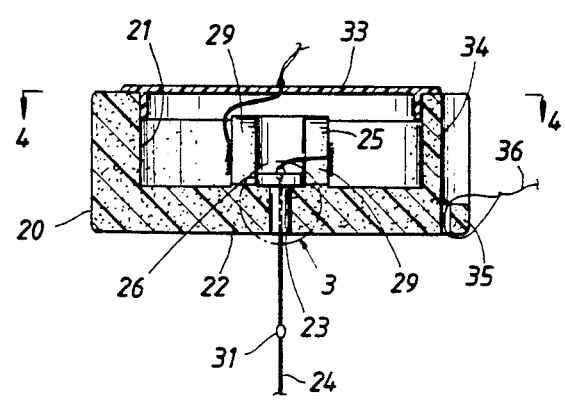
FIG. 2 is a vertical sectional view of the upper portion of the apparatus of FIG. 1 and showing the free end of the flexible line wrapped about a boss within the cavity of the body.

Beads 31 held on or formed integrally with the line 24 in predetermined spaced apart relation are somewhat larger than the hole 32 so that a selected bead may be supported on the upper end of the tube to suspend the chum basket at a desired depth. More particularly, the lower end of each bead is adapted to fit closely within a seat 32A formed about the upper end of hole 32. As best shown in FIG. 2, the free end of the line 24 is wrapped about the outer diameter of the boss 25 so as to store it in a convenient location within the cavity 21.

When it is desired to adjust the depth at which the chum basket is suspended, the tube is raised from its seated position to lift the slot 30 therein above the passage 23, so that the line 24 may be moved through it to a position in which a lower bead may be pulled upwardly or an upper bead moved downwardly through passage 23. For this purpose, the line is raised a short distance to lift the lower end of the supported bead 31 above the seat 32A on the upper end of the flange 27, to permit the line to be moved laterally through the slot 30. When the selected bead is raised or lowered through the passage, the line is moved back through the slot and the bead lowered onto the seat on the flange 27. Then the tube 28 may be lowered back into seated position on the seat 26.

Figure 6:
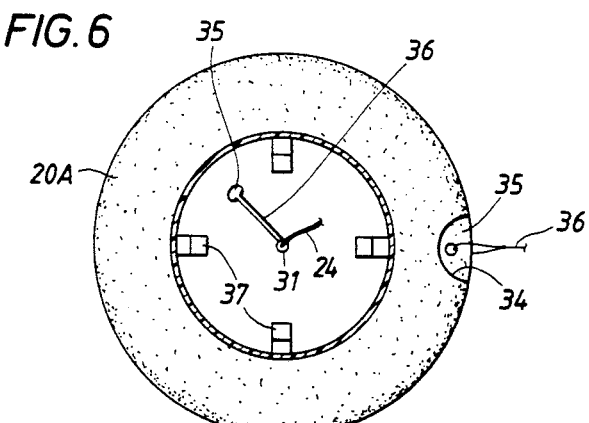
FIG. 6 is a horizontal-sectional view of the apparatus of FIG. 5, as seen along broken lines 6—6 of FIG. 5.
Figure 3:
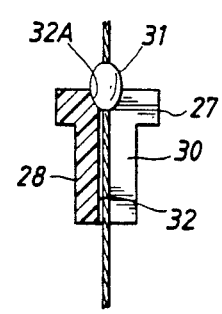
FIG. 3 is an enlarged cross sectional view of the portion of the apparatus of FIG. 2 indicated by the circle "3"
Figure 5:
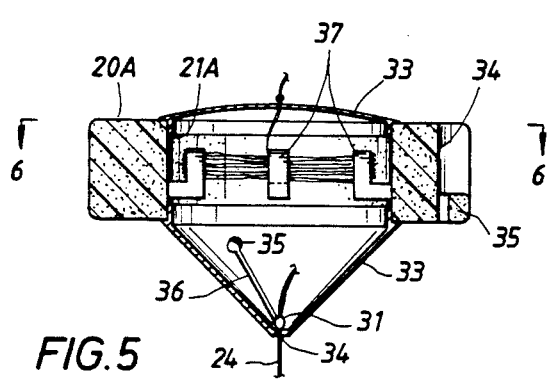
FIG. 5 is a vertical sectional view of the upper end of apparatus constructed in accordance with an alternative embodiment of the invention.
Figure 4:
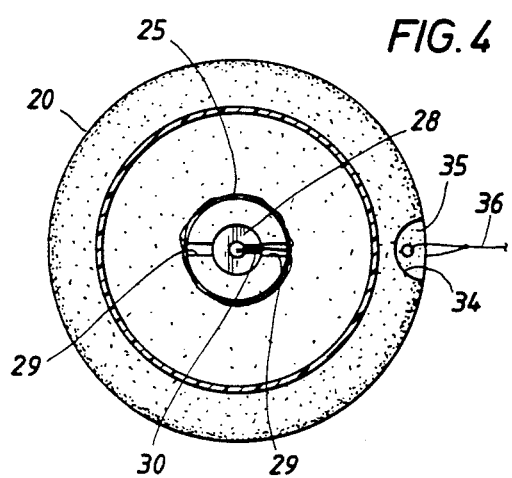
FIG. 4 is a horizontal sectional view of the apparatus of FIGS. 2 and 3, as seen along broken lines 4—4 of FIG. 2.

In the embodiment of the invention shown in FIGS. 5 and 6, the cavity 21A extends concentrically all the way through the body 20A of bouyant material, and as in the case of the cavity 21, is of cylindrical shape and arranged concentrically of the outer wall of the body 20A. In this embodiment, a lower wall 33 of plastic or other suitable material is removably disposed across the lower end of the cavity 21A and a hole 34 is formed therein to receive the flexible line 24 which may be identical to line 24 of the first described embodiment. More particularly, the hole 34 is somewhat smaller than each of the beads 31 spaced along the line 24 so as to support the bead, and thus the line therefrom, with the chum basket at the desired subsurface level.

In this embodiment of the invention, another hole 35 is formed in the wall and is connected to the hole 34 by means of a slot 36. As previously described, the hole 35 is larger than each of the beads 31 to permit them to pass therethrough, while the slot 36 is narrower than each of the beads, but sufficiently wide to permit the line 24 to be passed therethrough. Thus, when it is desired to adjust the suspended level of the chum basket C, the line is lifted and caused to pass outwardly through the slot 36 to a position in which a lower bead or an upper bead may be passed through the hole 35, depending on whether the suspended depth is to be increased or decreased. The line is then moved inwardly toward the hole 34 with the selected bead 31 above the slot 36 to permit it to be lowered onto a seat about the upper end of the hole 34. As shown, the wall 33 has an upper, downwardly converging surface so as to maintain the bead 31 in seated position on the upper end of the hole 34.

As also previously described, hooks 37 are mounted on the body about the cavity 21 in position to permit the free end of the line 24 to be wrapped thereabout.

The upper ends of the cavities of each embodiment are closed by means of a lid 33 removably mounted thereon and comprising a plastic disc having an outer flange adapted to seat on the upper side of the body and a depending flange for fitting closely within the recess. The lid of the embodiment of FIGS. 5 and 6 is shown to be somewhat domed, and, in the case of both lids the free end of the line extend through the lid to prevent loss.

In both embodiments of the invention, recesses are formed in one side of the body to form a flange 35 through which a hole is formed. This permits another line 36 to be tied to the body for locating it generally in a desired position on the water surface.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for use in suspending an object at desired depths below the water surface, comprising
   a body of buoyant material having a central cavity and adapted to float on the water surface with its cavity uppermost,
   a flexible line having one end from which the object may be suspended and beads at spaced locations along its length, and
   means on the body forming a small hole connecting with the cavity and through which the line but not the beads may extend, whereby each bead may be lowered onto a seat on the wall about the upper end of the hole, and a slot extending laterally from the hole and through which the line may be moved into a relieved area within the cavity through which the beads may pass into and out of the cavity and then back into the hole to permit a selected bead to be supported on the seat 2. As in claim 1, including
   means in the cavity about which the free end of the line may be wound for storage purposes.

3. As in claim 2, wherein
   said last mentioned means comprises a plurality of hooks spaced about the periphery of the cavity, 4. As in claim 2, wherein
   said last mentioned means comprises the outer surface of an upstanding boss through which the hole and slot extend 5. As in claim 1, which
   said body includes a lower wall beneath the cavity and through which a passage is formed, and
   the hole and slot are formed in a hollow tube removable supported within the passage to connect the slot with an enlarged area within the cavity.

6. As in claim 1, wherein
   the opening and slot are formed in a lower wall supported from the body beneath the cavity, and
   the enlarged area comprises an enlarged hole in the lower wall at the end of the slot away form the small hole.

7. As in claim 1, including a lid removably mountable on the body to cover the cavity.

* * * * *